United States Patent [19]
Giedt et al.

[11] Patent Number: 5,483,036
[45] Date of Patent: Jan. 9, 1996

[54] METHOD OF AUTOMATIC MEASUREMENT AND FOCUS OF AN ELECTRON BEAM AND APPARATUS THEREFOR

[75] Inventors: Warren H. Giedt, San Jose; Richard Campiotti, Livermore, both of Calif.

[73] Assignee: Sandia Corporation, Albuquerque, N.M.

[21] Appl. No.: 142,077

[22] Filed: Oct. 28, 1993

[51] Int. Cl.⁶ .............................. B23K 15/00; G01T 1/29
[52] U.S. Cl. ................. 219/121.14; 219/121.26; 250/397; 324/71.3
[58] Field of Search ................... 219/121.13, 121.14, 219/121.25, 121.26, 121.27; 324/71.3, 404; 250/397, 396 R

[56] References Cited

U.S. PATENT DOCUMENTS

| | | | |
|---|---|---|---|
| 3,134,892 | 8/1961 | Opitz et al. | 219/69.1 |
| 3,151,231 | 1/1961 | Steigerwald et al. | 219/121.13 |
| 3,426,174 | 12/1965 | Graham et al. | 219/121.12 |
| 3,513,285 | 8/1967 | Imura et al. | 219/121.3 |
| 3,576,420 | 4/1971 | Iceland et al. | 219/121.26 |
| 3,691,341 | 9/1972 | Roiron et al. | 219/121.26 |
| 3,699,304 | 10/1972 | Baldwin, Jr. et al. | 219/121.26 |
| 3,766,365 | 10/1973 | Scott | 377/13 |
| 4,158,122 | 6/1979 | Podola et al. | 219/121.26 |
| 4,321,510 | 3/1982 | Takigawa | 250/397 |
| 4,336,597 | 6/1982 | Okubo et al. | 250/397 |
| 4,608,493 | 8/1986 | Hayafuji | 250/397 |
| 4,645,506 | 3/1987 | Sakamoto et al. | 219/121.26 |
| 4,703,256 | 10/1987 | Hayafuji | 324/71.3 |
| 5,103,161 | 4/1992 | Bogaty | 324/71.3 |
| 5,382,895 | 1/1995 | Elmer et al. | 324/71.3 |

FOREIGN PATENT DOCUMENTS

| | | | |
|---|---|---|---|
| 53-9566 | 1/1978 | Japan | 324/71.3 |
| 55-86057 | 6/1980 | Japan | 250/397 |

OTHER PUBLICATIONS

Hicken et al., "Correlation of Joint Penetration with Electron Beam Current Distribution", Supplement to the *Welding Journal*, Mar. 1991, pp. 69–S to 75–S.

Giedt et al., "Prediction of Electron Beam Depth of Penetration", *Welding Research Supplement*, Dec. 1988, pp. 299S to 305S.

Hartwig et al., "Technique for Sampling Focused Electron Beam for Welding Application", Sandia Tech. Document SAND85–8710, Jul. 1985.

*Primary Examiner*—Geoffrey S. Evans
*Attorney, Agent, or Firm*—Timothy D. Stanley; Gregory A. Cone; Bruce M. Windell

[57] ABSTRACT

An electron beam focusing system, including a plural slit-type Faraday beam trap, for measuring the diameter of an electron beam and automatically focusing the beam for welding. Beam size is determined from profiles of the current measured as the beam is swept over at least two narrow slits of the beam trap. An automated procedure changes the focus coil current until the focal point location is just below a workpiece surface. A parabolic equation is fitted to the calculated beam sizes from which optimal focus coil current and optimal beam diameter are determined.

54 Claims, 8 Drawing Sheets

FIG. 1
(PRIOR ART)

EFFECT OF BEAM FOCAL POINT LOCATION ON BEAM SIZE AT WORKPIECE SURFACE

METHOD OF AUTOMATIC MEASUREMENT AND FOCUS OF AN ELECTRON BEAM AND APPARATUS THEREFOR

STATEMENT AS TO RIGHTS TO INVENTIONS MADE UNDER FEDERALLY-SPONSORED RESEARCH AND DEVELOPMENT

The government has rights to this invention pursuant to contract number DE-AC04-76DP00789, awarded by the U.S. Department of Energy.

FIELD OF THE INVENTION

The invention is for use in the field of electron beam, vacuum chamber welding.

BACKGROUND OF THE INVENTION

Figure 1:
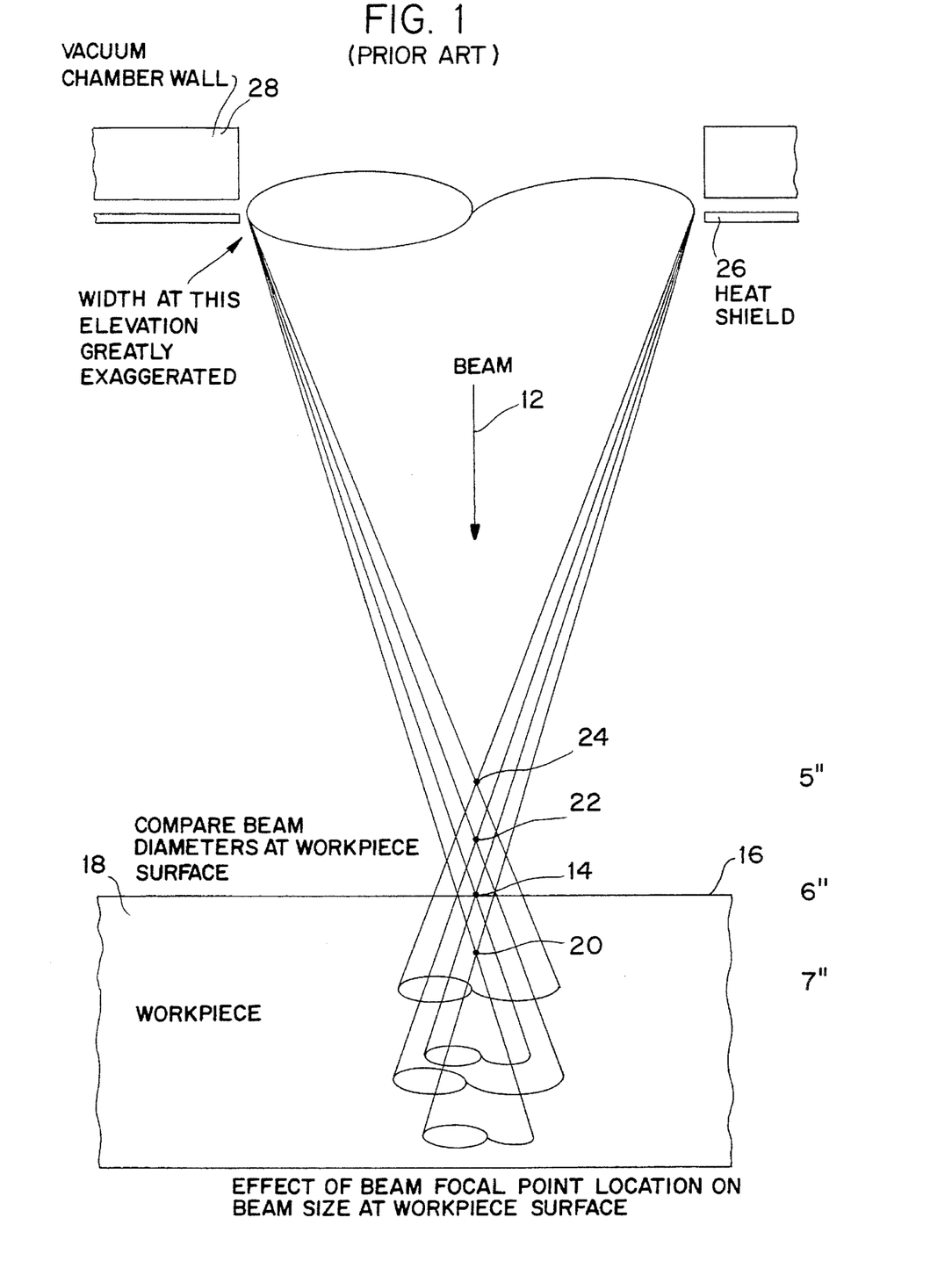
FIG. 1 depicts the effect of beam focal point location on the size of the beam at the workpiece surface.

In reference to FIG. 1, in the field of electron beam welding, one wishes to control the beam 12 so that the focal point 14 coincides with the surface 16 of the workpiece 18 to be welded. When focal point 14 is just below surface 16, optimal circumstances occur: the cross-sectional size of beam 12 is at a minimum, thereby causing the current density of the beam 12 at that location to be a maximum and the depth to which the weld extends down into workpiece 18 ("weld depth") to be a maximum. In general, maximum depth and a narrow fusion zone for the selected power input are desired. Where the focal point 20 is significantly below the surface 16 of workpiece 18 or focal points 22 or 24 are above the surface 16, the current density at the surface 14 is not at a maximum because the cross-sectional size of beam 12 at surface 16 is not at a minimum. Consequently, weld depth, and therefore a narrow width fusion zone, are not maximized.

Comparisons of results obtained from different operators and electric welding machines indicate variations of ±20% to ±40% variation in weld depth for the same nominal power input. "Prediction of Electron Beam Depth of Penetration," Giedt, W. H., and Tallerico, L. N., *Welding Journal*, Research Supplement, pp. 299-s to 305-s, December 1988. Beam focus location has been shown to have a major influence on penetration. Hence, a basic problem in the art is to focus the beam 12 so that its focal point 14 is just below the surface 16 of workpiece 18.

Figure 6:
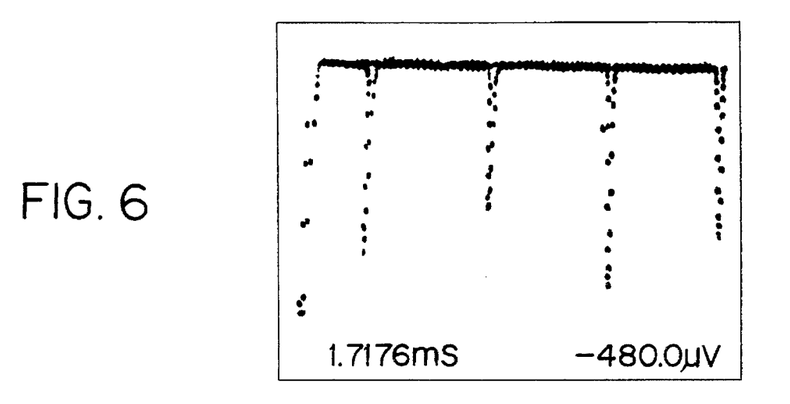
FIGS. 6 and 7 depict representative profile measurements obtained by increasing the resolution of the oscilloscope's display until only one set of five profiles was shown.

A number of factors affect the beam focal point: beam current; beam voltage; filament current; focus coil current; travel speed; distance from the electron gun to the workpiece; chamber vacuum level; etc. Although an error or deviation in any machine setting will have some influence on penetration, the most important factor in determining beam focus location has been found to be the focus coil current. In other words, to focus the beam, one adjusts the current passing through the focus coil, or magnetic lens, 6. The focus coil, or magnetic lens, 6 is below the electron gun anode as illustrated in FIG. 6.

A visual and manual version of this approach requires an operator of an electron-beam-welder to position a piece of metal having a high melting point, e.g., tungsten, so that its upper surface is in the same location as will be surface 16 of workpiece 18. The operator then observes the bright spot where the beam 12 contacts the metal piece and adjusts the current in the coil, thereby changing the focal point of the beam, until it appears to the operator as though the bright spot has been minimized.

The visual-manual technique is generally satisfactory at lower current levels, but becomes difficult to apply at higher levels, e.g., currents above 10 mA. It has the limitations or problems in that (1) it is subjective and (2) is only qualitative. It fails to provide a quantitative measure of the beam attributes of focused beam size and of current distribution, i.e., it fails to provide a beam profile.

These beam attributes are influenced by filament current, filament condition, and filament orientation in the electron gun. In comparison to the other components of an electron beam welder, a filament is not durable. A filament's rate of decay varies with the different conditions under which the beam welder is operated. Recommended operating practice is to operate with the filament heated to the "space-charge limited condition" in which a quasi-steady "electron cloud" exists next to the center of the filament. This cloud contains an excess of electrons from which electrons are drawn to form the beam. Overheating the filament shortens its useful life.

To extend filament life, it is desirable to operate at temperatures just high enough to produce a space-charge limited condition. This condition is usually determined by overheating the filament and then observing, as the filament current is decreased, when the beam current begins to decline. When filament current is close to, but less than sufficient for producing the space-charge condition, the beam current does not decrease. Consequently, an operator may select this nearly sufficient current. Beam profile measurements have shown, however, that using nearly sufficient current produces an apparent minimum sized beam but one which is larger and less concentrated than an optimal beam at the surface, thereby reducing weld depth. Measuring the profile of the beam would reveal this deceptive "nearly sufficient" current condition.

SUMMARY OF THE INVENTION

It is an object of this invention to provide a method and apparatus to focus the beam so that its focal point is just at the surface of the workpiece, slight adjustments from this condition can be made if desired.

It is an object of this invention to provide a method and apparatus that produce a quantitative measure of the beam attributes of focused beam size and of current distribution, i.e., a beam profile.

It is an object of this invention to enable quantitative optimization of beam focus and beam profile in an electron beam welder so as to optimize weld quality.

This invention also has the advantage that it may improve weld consistency and, therefore, quality by achieving consistent determination of focus coil current. This is particularly advantageous to inexperienced electron beam welder operators, and also all operators using higher beam currents. By providing a way to check that the beam focal point has not changed, a reduction in rejected welds may be achieved, producing savings in the cost of post-weld inspection requirements.

This invention also has the advantage that it may reduce weld development time, and therefore cost, because it is simple, easy to operate, and can be used rapidly and automatically to set focus coil current. Using the present invention may enable a welding engineer to make more accurate initial selection of machine settings and then be more confident in his knowledge of the actual beam focal point.

The objects of the present invention are fulfilled by providing an electron beam focusing system, including a plural slit-type Faraday beam trap, for measuring the diameter of an electron beam and automatically focusing the beam for welding. Beam size is determined from profiles of the current measured as the beam is swept over at least two narrow slits of the beam trap. An automated procedure changes the focus coil current until the focal point location passes through the elevation of a workpiece surface. A parabolic equation is fitted to the calculated beam sizes. Then optimal focus coil current and optimal beam diameter are determined.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTIONS OF THE PREFERRED EMBODIMENTS

Figure 2:
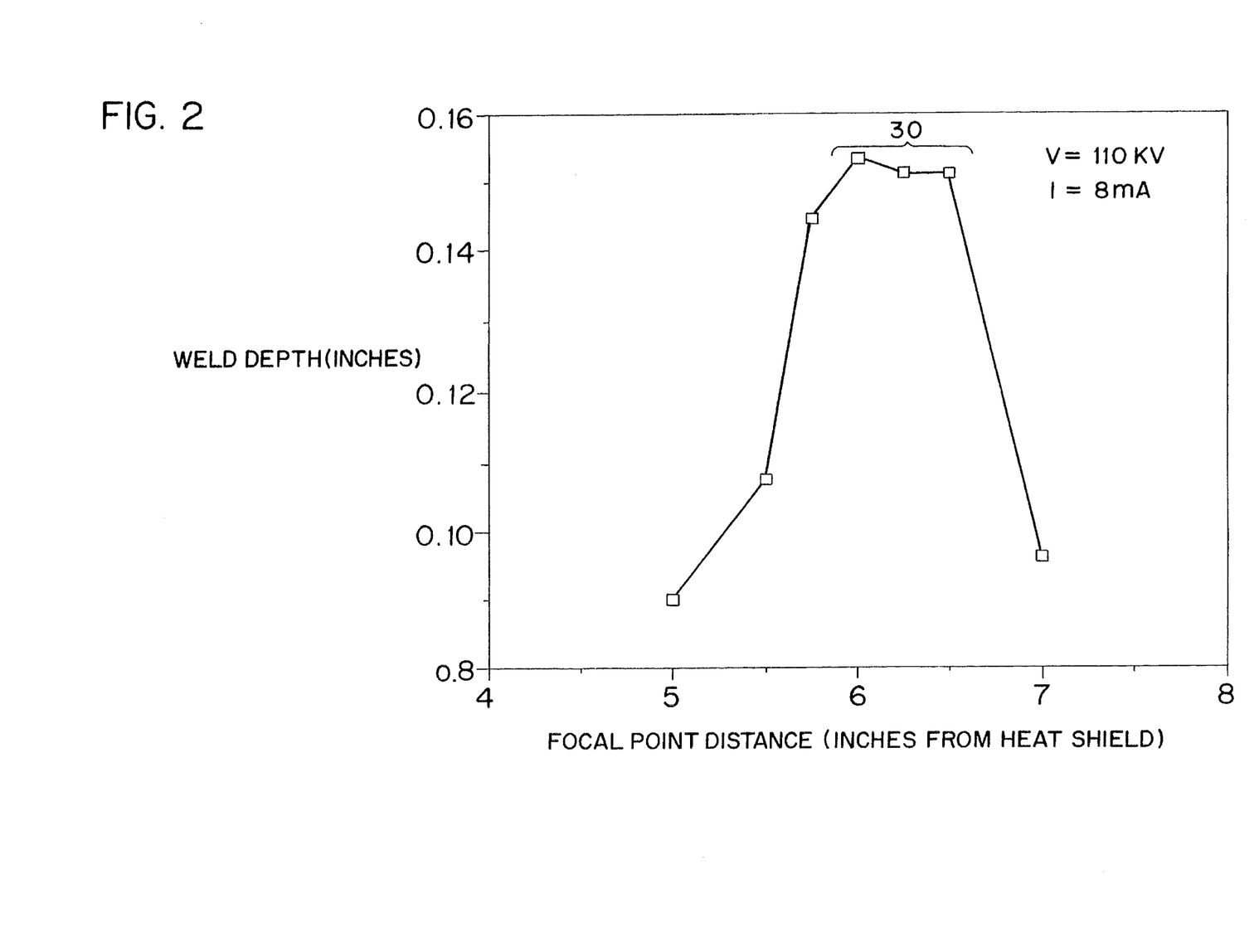
FIG. 2 is a plot of variation in Weld Depth as a function of Focal Point Distance from the Heat Shield.

FIG. 2 is a plot of variation in Weld Depth as a function of Focal Point Distance from the Heat Shield (e.g., 26 of FIGS. 1 and 2) in an exemplary electron beam welding apparatus. Maximum weld depth (30 FIG. 2) is achieved at a focal distance of about 6–6.5 inches from the heat shield 26. In the range of 6–6.5 inches, the focal point of the beam varies from approximately the surface to approximately 0.5 inch below the surface of the workpiece being welded, a 304L stainless steel plate. If the focal distance is slightly increased or decreased, i.e., if the focal point is moved slightly above or below the 6–6.5 inch region, weld depth decreases very rapidly. FIG. 2 presents a strong motivation for one of ordinary skill in the art to use the instant method and apparatus for focusing an electron welding beam by controlling the focus coil current because the instant invention enables sufficient focusing of the beam to achieve weld depth optimization.

Figure 3:
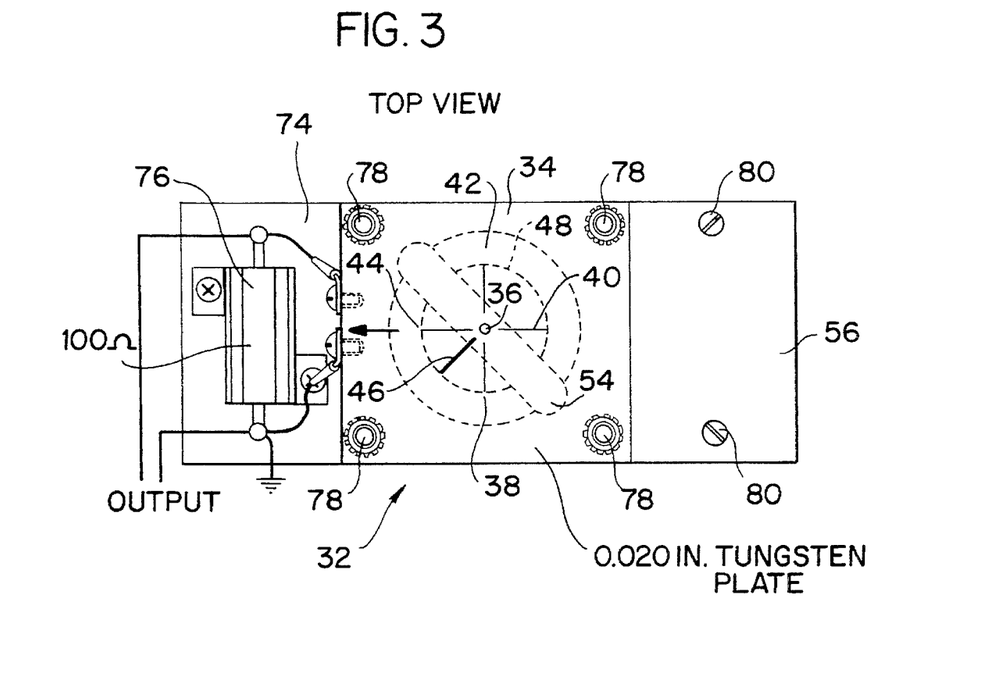
FIGS. 3 and 4 depict a top and side view, respectively, of a first embodiment, a first profilometer (a plural slit-type Faraday electron beam trap)
Figure 4:
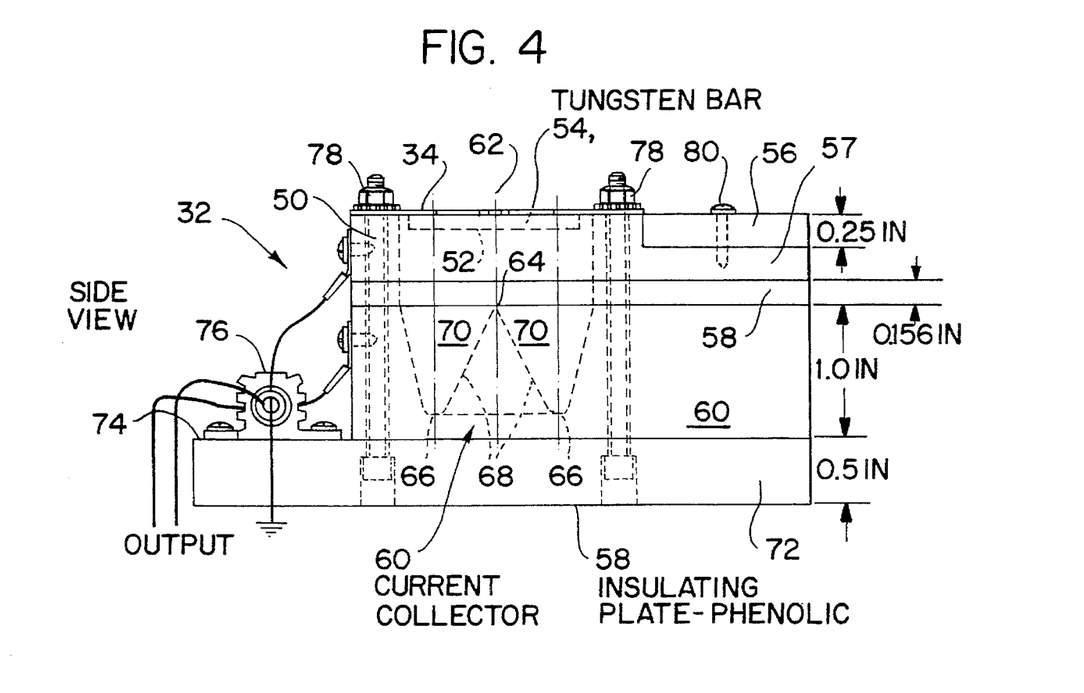

FIGS. 3 and 4 depict a top and side view, respectively, of a first embodiment of Applicants' invention, a first profilometer. The first profilometer 32 is a plural slit-type Faraday electron beam trap. A Faraday slit-type electron beam trap in its most basic form is a slit between two pieces of metal, the metal having a high melting point. The electron beam is swept across the slit and the current that passes through the slit is measured, usually by a device positioned beneath, and electrically isolated from, the plates.

The first profilometer 32 of FIG. 4 includes: a thin upper plate 34 made of a metal having a high melting point, such as tungsten (e.g., 0.02 inch thick). The upper plate has a center hole 36, a first slit 38, a second slit 40, a third slit 42, a fourth slit 44, and an index slit 46. The center hole 36 is sufficiently large so that the electron beam can pass though it without contacting the upper plate 34, when the beam is approximately focused on a center point in the center of center hole 36. The first slit 38 is substantially radial to the center point (i.e., substantially perpendicular to an imaginary first tangential line that passes through a first imaginary point on an imaginary circle 48 circumscribed around the center point), for a given radius. The second slit 40 is substantially radial to the center point (i.e., substantially perpendicular to a second imaginary tangential line through a second imaginary point on circle 48). The second slit is also substantially perpendicular to the first slit.

The third slit is substantially radial to the center point (i.e., substantially perpendicular to a third imaginary tangential line through a third imaginary point on the imaginary circle 48). The third slit is substantially collinear with the first slit but diametrically opposed across the center point from a position of the first slit. The fourth slit is substantially radial to the center point (i.e., substantially perpendicular to a fourth imaginary tangential line through a fourth imaginary point on the imaginary circle 48). The fourth slit is substantially collinear with the second slit but diametrically opposed across the center point from the second slit. The index slit 46 is substantially radial to the center point (i.e., substantially perpendicular to a fifth imaginary tangential line through a fifth imaginary point on the circle 48). It is positioned within a first angle defined by the first slit and fourth slits, so that it substantially bisects the angle between the first and fourth slits.

Slits 38–46 are electric-discharge machined into the upper plate 34. An example of the consistency in width of the slits is:
first slit 38=0.00272 inch
second slit 40=0.00291 inch
third slit 42=0.00299 inch
fourth slit 44=0.00291 inch
index slit 46=0.00863 inch
The variation of 0.0002 inch is on the order of 7%. Although this variation could be accounted for, the slit width is not required in the profile calculation that results in a determination of an effective beam diameter, to be described later in the specification.

The upper plate actually only requires two slits oriented with respect to the center point, the first and second slits substantially defining a pair of intersecting axes intersecting at the center point. The slits may define any angle, although 45° and 90° are the angles most likely to reveal an ellipsoidal beam shape when profiling the beam. Adding the third, fourth, and index slits, at any angle, respectively, improves the accuracy of the profiling.

The first profilometer 32 also includes an energy sink 50 mounted underneath, and extending in the shape of a flange 57 out to one side of, upper plate 34. Energy sink 50 is grounded and preferably formed of a very conductive metal, such as copper, and has a maximum thickness of approximately ½ inch. In between upper plate 34 and energy sink 50, in a channel 52 in energy sink 50 is a bar 54 shaped to fit in, and have very low resistivity contact with, the channel 52. The bar 54 is preferably made of a high melting point metal, such as tungsten. The bar 54 is approximately ⅛ inch thick, which is ¼ of the maximum thickness of the energy sink 50. The channel 52 and bar 54 are aligned along a line that substantially bisects the angles between the first slit 38 and second slit 40, and third slit 42 and fourth slit 44, respectively, and is perpendicular to index slit 46. Extending out to one side of upper plate 34, in the shape of flange 57, is a section of the energy sink 50 that is approximately ½ inch thick. Mounted above, and in very low resistivity contact with, flange 57 is a replaceable plate 56 for approximate visual focusing of the beam, preferably made of a high melting point metal, such as tungsten. Mounted beneath the energy sink 50 is an electrical insulator 58, preferably made from a dielectric exhibiting high resistivity, such as phenolic or Teflon™, i.e., tetrafluoroethylene. Insulator 58 is just sufficiently thick to insulate electrically energy sink 50 from current collector 60.

Current collector 60, is mounted underneath the insulator 58, and is substantially formed in the shape of a surface of revolution symmetric about a revolution axis 62, the revolution axis being substantially orthogonal to a plane substantially defined by the upper plate 34, the revolution axis substantially passing through the center point. The surface of revolution is a planar curve substantially in the shape of a lowercase letter w having a central vertex 64 and two rounded outer vertices 66, the outer vertices 66 each having an inner side 68, the inner sides being connected together at the central vertex 64, the revolution axis 62 substantially passing through the center vertex 64. Though any axially symmetric shape of current collector will suffice, the w-shaped collector has been found to produce more accurate results because its sloping walls minimize the reflection of electrons back to upper plate 34. The w-shaped surface of revolution of current collector 60 forms an inversely, or complimentarily, shaped void 70. An insulator 72 is mounted beneath, and extends in the shape of a flange out to the side of, current collector 60. Mounted on insulator flange 72 is resistor 74, typically of 100 ohms resistance (so as to produce a readily measured voltage drop). One terminal of resistor 74 is connected to ground and the other is connected to current collector 60. Layers 34, 50, 58, 60, and 72 of the first profilometer 32 are held together by electrically isolated bolt assemblies 78. Replaceable approximate focus plate 56 is held against energy sink flange 57 by screw assemblies 80.

Use of the first profilometer will now be described. Although electron beams are approximately axisymmetrical at the focal point, they are elliptical above and below this focal point. An improved picture of the profile can therefore be obtained if the current distribution is measured at different angular slit orientations. For practical reasons, the slits of the first profilometer are oriented so that they are either parallel or normal to the welding direction. As alluded to above, however, the slits may take any angular orientation to the welding direction.

The beam deflection coils (82 FIG. 5) are used to move the beam over the slits 38–46. Though it is most simple to rotate the beam in a circle, e.g., one having a smaller radius than imaginary circle 48 (FIG. 3), any pattern can be used, e.g., ellipsoidal, Lissajous figure, etc. As the beam passes over a slit, a fraction of the beam passes through to current collector 60. The remainder not passing through is collected on the upper plate 34 and passed through energy sink 50 to ground. Current density of the beam can be determined as a function of measuring the variation in the voltage drop across the resistor 76 caused by the electron flow emanating from the current collector 60. Current variation with respect to location (equal to beam angular velocity multiplied by the time measured from the start of the current flow) can then be determined from a record of the voltage drop, details to be described later in the specification.

Previous testing has shown that when a beam is first turned on, it takes on the order of 50–100 milliseconds to build up to a steady-state value. Because the thin tungsten upper plate 34 would be damaged if exposed to the beam for this length of time, the first profilometer incorporates tungsten bar 54. When the beam is aimed at the center point, it passes through center hole 36 in upper plate 34 and contacts bar 54. Like replaceable approximate focus plate 56, bar 54 can be replaced if damaged.

The test procedure is: center the central vertex 64 of collector 60 (so that the beam will pass through the central hole 36 in upper plate 34), turn on the beam, and after about 100 milliseconds activate the deflection coils 82 to move the beam by rotating in a circle approximately 0.5 inch in diameter. Because of its larger width, more current passes through index slit 46 than any of the other slits. Consequently, this difference between the index slit and the other slits is used to identify beam angular location, details to be described later in the specification.

Figure 5:
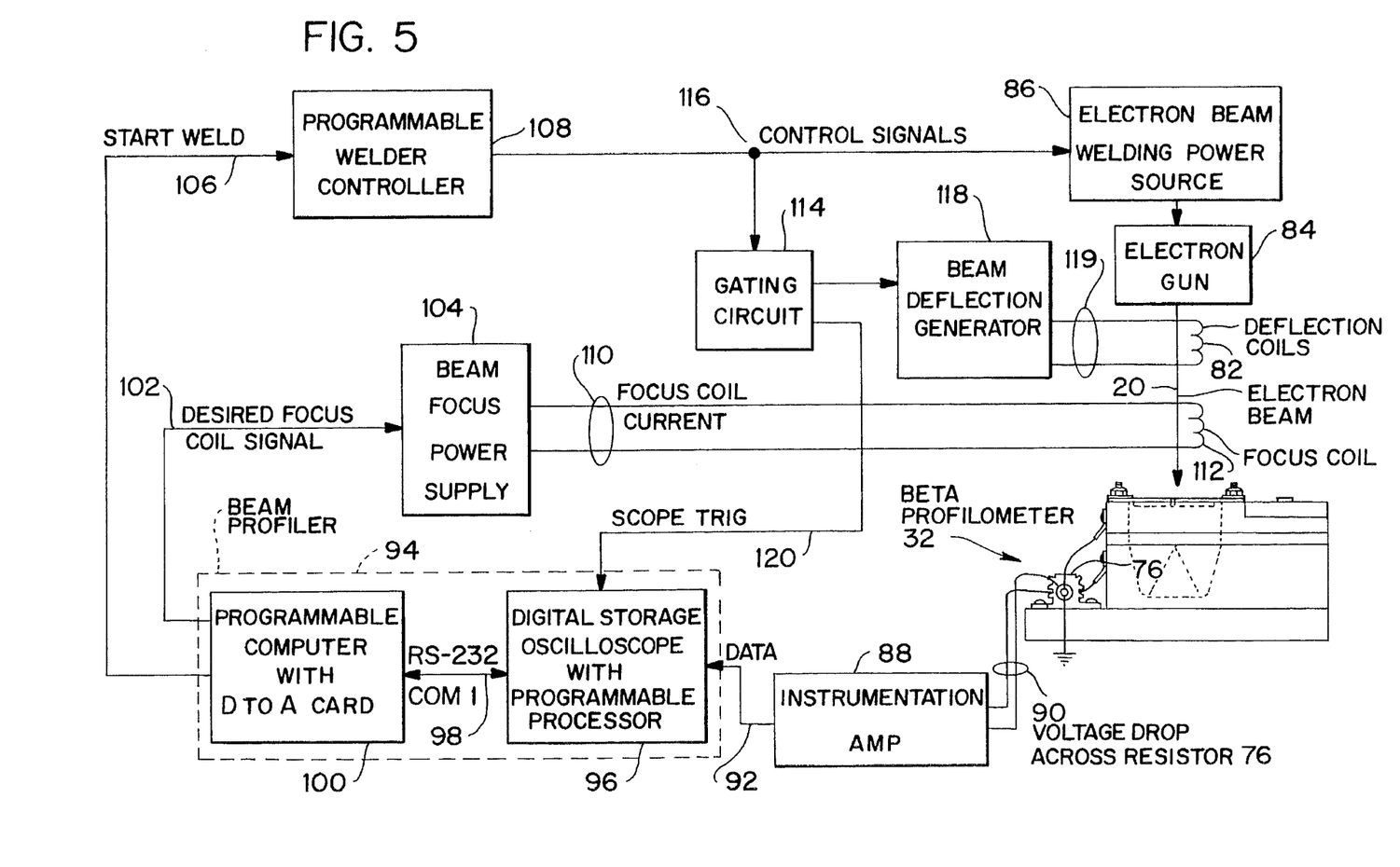
FIG. 5 depicts Applicants' system that uses the first profilometer.

Applicants' system that uses the profilometer will be discussed next with reference to FIG. 5. First profilometer 32 is shown beneath electron gun 84, which is electrically driven by electron beam welding power source 86. The terminals of resistor 76 of first profilometer 32 are connected to instrumentation amplifier 88, which is used as an isolation device having, for example, unit gain. Amplifier 88 is connected to beam profiler-controller 94, which records and analyzes the beam's profile, controls the focus coil current, and initiates electron beam welding.

Beam profiler-controller 94 includes a digital storage oscilloscope 96 that digitizes and stores the data. In addition, scope 96 includes a programmable computer that calculates the beam profile. A commercial example of such a scope 96 is the Nicolet Model Pro 40 Digital Storage Oscilloscope. As well as display capability, the Nicolet scope includes a 386 processor, an RS-232 communication port, and digital storage sufficient to store 100,000 data points or approximately 3–5 sets of profiles when sampling every 0.2 microseconds for 3–5 millisecond periods (rotation angular velocity of 900 Hertz). Scope 96 analyzes a beam profile and outputs digital focus coil control signals to a digital to analog converter (A/D) 100 over communication link 98. Applicants have used a programmable computer including an RS-232 communication port and D/A circuit card, as D/A 100. Link 98 is an RS-232 cable.

Beam profiler-controller 94 is connected to beam focus power supply 104 and programmable welder controller 108 and outputs desired focus coil signal 102 and start welding signal 106 thereto, respectively. Beam Focus Power Supply 104 outputs focus coil current 110 to focus coil 112 in response to the desired focus coil signal 102. Programmable welder controller 108 is connected to the electron beam welding power source 86 and gating circuit 114 and outputs welding control signals 116 thereto, respectively. Gating circuit 114 is connected to beam profiler-controller 94 and outputs an oscilloscope trigger signal 120 thereto. Gating circuit 114 also outputs a signal to beam generator 118 which causes the generator 118 to turn the deflector coils 82 on and off via current 119.

A commercial version of programmable welder controller 108 is the Allen Bradley model 8200 programmable CNC Controller. In response to the start weld signal 106, this controller executes the following test routine: turns welding beam 20 on; waits 100 milliseconds for beam 20 to settle to a steady-state value; turns the deflection generator 118 on while substantially simultaneously triggering the storage of data from the beam profilometer 32 by the digital oscilloscope 96 with scope trigger signal 120; waits approximately 5–10 milliseconds and then turns off the deflection generator; and then waits another 100 milliseconds before turning off the beam current.

Figure 7:
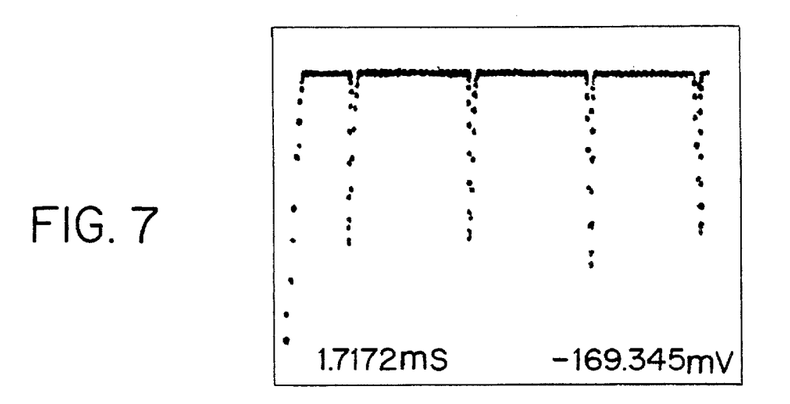

FIGS. 6 and 7 depict representative profile measurements obtained by increasing the resolution of the oscilloscope's display until only one set of five profiles was shown. In each, the largest negative spike is at the left-most side of the figure and corresponds to current collected from the index slit 46, and slits 1–4 follow in numerical order left to right, respectively. FIG. 3 had the conditions of 8 milliamps beam current, 110 kVolts beam voltage, with a focal point located at the surface. FIG. 4 had the conditions of 4 milliamps beam current, 110 kVolts beam voltage, with a focal point located slightly above the surface. FIG. 4 has discernable differences in peak magnitudes between alternate profiles, which indicates that the beam was elliptically shaped with its long axis normal to the weld direction.

For practical applications of current distribution measurements, e.g., prediction of weld depth, it is necessary to provide a quantitative characterization of the beam. Analytical studies have shown that it is satisfactory to assume a symmetrical Gaussian current distribution. To evaluate a Gaussian distribution parameter, it is necessary to calculate first and second moments for each of the one-dimensional Gaussian distributions provided by the current collector when the beam passes through each of the slits, respectively.

Figure 8:
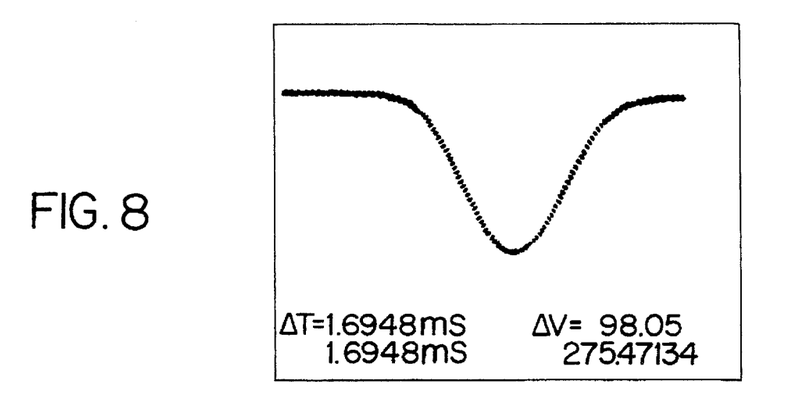
FIG. 8 depicts a representative single profile measurement from FIG. 6, obtained by increasing the resolution of the oscilloscope's display until only one profile was shown.

FIG. 8 depicts a representative single profile measurement from FIG. 6, obtained by increasing the resolution of the oscilloscope's display until only one profile was shown. The individual points (V(i)) represent measurements of the voltage drop across the 100 ohm resistor, the voltage drop being sampled at 0.2 microsecond intervals ($\Delta t$). Denoting the location of any V(i) in the beam by $x_i$, the current density at $x_i$, namely $I(x_i)$, is given by $V(i)/R\Delta s$, where $\Delta s$ is slit width (which is known for each slit). The velocity (v) of the beam crossing the slit was about 1,400 inches per second (3,600 cm/sec). The appropriate width increment between data points is $\Delta x = v\Delta t$. Hence, the total beam current can be expressed in terms of the following summation over the profile (typically including 170–200 data points):

$$I = \Sigma I(x_i)\Delta x = \Sigma[V(i)/R\Delta s]v\Delta t \quad (1)$$

or $$I = [v\Delta t/R\Delta s]\Sigma V(i) \quad (2)$$

The density per unit current (e.g., in mA/cm mA) then is:

$$i(x_i) = I(x_i)/I = V(i)/[v\Delta t \Sigma V(i)] \quad (3)$$

A second summation gives the first moment, or mean, M(x) of the distribution:

$$M(x) = \Sigma v(t_i - t_1)[V(i)/\{v\Delta t \Sigma V(i)\}v\Delta t] \quad (4)$$

$$= [v/\Sigma V(i)]\Sigma(t_i - t_1)V(i) \quad (5)$$

Similarly, the second moment $M(x^2)$ is:

$$M(x^2) = \Sigma v^2(t_i - t_1)^2[V(i)/\{v\Delta t \Sigma V(i)\}]v\Delta t \quad (6)$$

$$= \{v^2/\Sigma V(i)\}[\Sigma(t_i - t_1)^2 V(i)] \quad (7)$$

The standard deviation $\sigma$, or square root of the variance $\sigma^2$, is:

$$\sigma^2 = [M(x^2) - M(x)^2] \quad (8)$$

$$\sigma^2 = \{v^2/\Sigma V(i)\}[\Sigma(t_i - t_1)^2 - (1/\Sigma V(i))\{\Sigma(t_i - t_1)V(i)\}^2] \quad (9)$$

The effective area of the beam is larger than the area within a radius equaling the standard distribution parameter $\sigma$. Consequently, the radius $\sigma_B$, which defines an area within which 95% of the beam's current flows, has been introduced. This parameter is commonly used in describing welding heat sources and by the following is related to $\sigma$:

$$\sigma_B^2 = 6\sigma^2 \quad (10)$$

The effective beam diameter DB is then specified as $2\sigma_B$.

Figure 9:
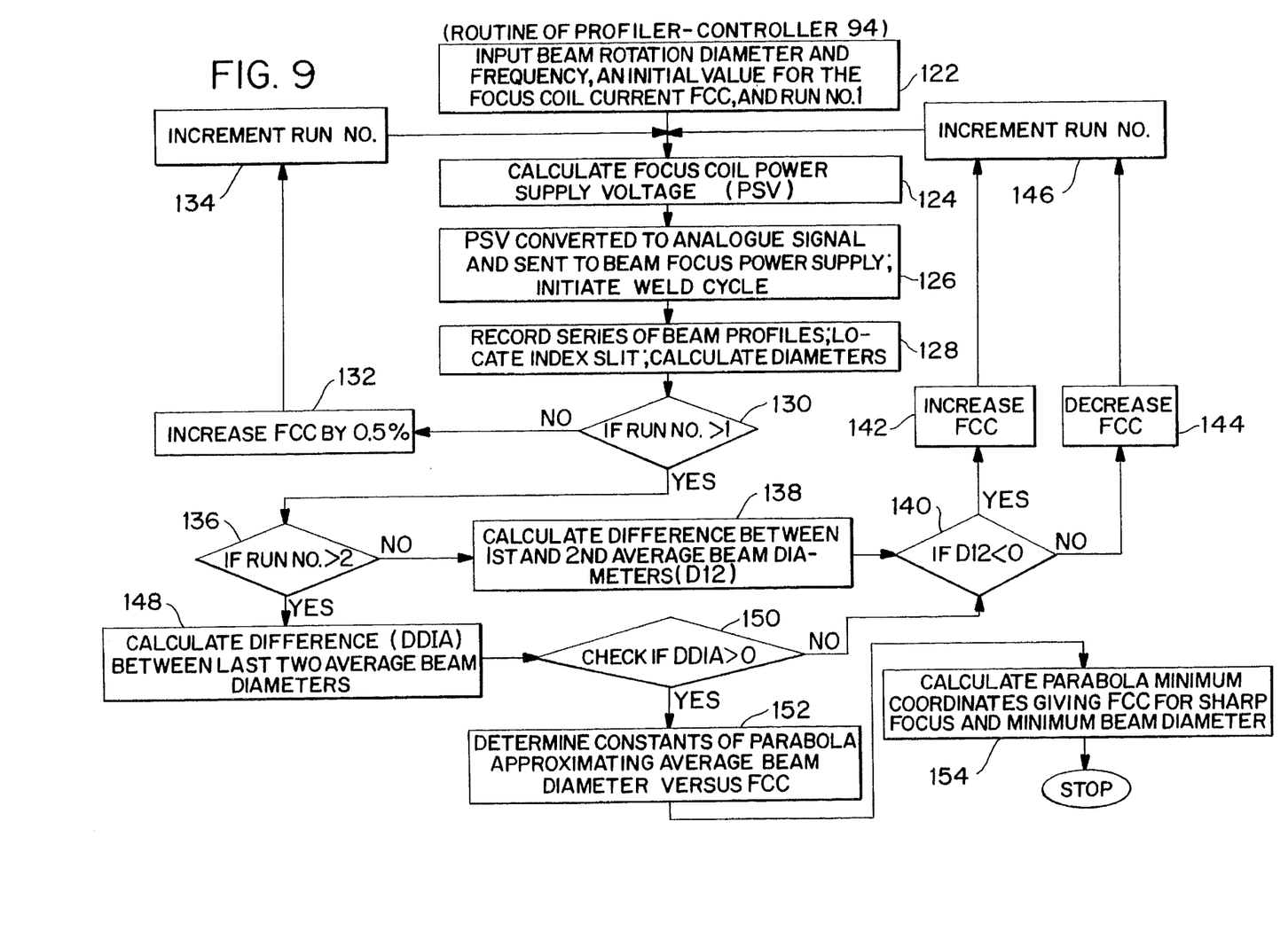
FIG. 9 depicts the routine used by the beam profiler-controller to calculate average DB and determine desired focus coil current.

After several sets of beam profiles are measured and stored, the beam profiler-controller 94 automatically calculates an average effective beam DB diameter based upon one set of profiles. Using the average DB, the beam profiler determines a new focus coil current signal, outputs signals to change the focus coil current, and then turns on the welder. FIG. 9 depicts the routine that calculates average DB and determines focus coil current changes.

Box 122 of FIG. 9 indicates that values for the beam rotation diameter, rotation frequency, and initial focus coil current are input to the program in the beam profiler-controller 94. Initial focus coil current can be estimated from experience or determined by directing the beam on the replaceable approximate focus plate 56 using the visual-manual technique described in the Background Section, above. Next, box 124 indicates that focus coil power supply voltage (PSV) is calculated. In box 126, PSV is converted from a digital to analog signal and output to the beam focus power supply 104. A test routine program stored in the programmable welder controller 108 turns the beam on for about 100 milliseconds, rotates the beam for about 5–10 milliseconds, and then turns off the beam. Next, box 128 indicates that a sufficient number of data points to represent 3–5 sets of slit profiles are stored. The index slit or one set of profiles is located, and beam diameters are calculated for each profile along with an average effective beam diameter. The program in the beam profiler-controller locates the index slit by performing a maximum magnitude sort on the entire set of data points. Because the index slit is wider than any other slit, it will always produce the profile with the maximum magnitude.

Individual profiles are then located in sequence. For each profile, the calculation first involves determining a reference voltage from which profile magnitudes are determined and then computing the first and second moments, as described above. Recording and processing a set of four profiles requires about 2 minutes. The average diameter is calculated from the available slit profiles, not including the index slit profile.

The logic for changing the focus coil current is described in boxes 130, 132, and 136. Decision box 130 indicates that it is determined whether the present Run No. is greater than one. If not (meaning it is the first run as indicated by decision box 132), the focus coil current (FCC) is increased from the initial value by 0.5%. Recall that increasing FCC causes the focal point to move upward, i.e., closer to the electron gun 84. In other words, D2 will always be above D1. Box 134 indicates that the Run No. is incremented by one and another set of profiles is collected and calculations made therefrom. If the Run No. (as indicated by decision box 130) is greater than one (meaning at least the second run), then (as indicated by decision box 136) it is determined whether the present Run No. is greater than 2. If the outcome is no, (as indicated by box 138) the difference between the first and second average diameters, D12, is calculated.

If the difference value D12 is less than zero, then FCC is increased, as indicated in box 142. If the difference value D12 was greater than zero, then FCC is decreased, as indicated by box 144. Run No. is again incremented (as indicated by box 146) by one and a new test routine is initiated.

If the Run No. is greater than two (meaning at least the third run), then the difference between the last two average beam diameters, DDIA, is calculated as indicated by box 148. If DDIA is not greater than zero, then the program considers the sign of difference D12, as indicated by boxes 150 and 140, and then proceeds to change FCC. When DDIA goes positive, box 152 indicates that the average beam diameter has passed through it minimal value.

At this final stage, (as indicated by box 154) the constants of a parabolic equation are determined from the calculated beam diameters using the method of least-squares. This parabola approximates the average effective beam diameter as a function of FCC. Box 154 indicates that the optimum FCC and minimum beam effective average diameter are determined by the minimum point of this parabola.

Testing of the first profilometer 32 has been conducted on a Model 1200 Leybold-Heraeus EB welder. Illustrative results for the series of focus coil currents selected by the beam profiler-controller are listed in Tables 1 and 2. These results are for an 8 milliamp, 110 kV beam with a work distance, i.e., distance below the vacuum chamber heat shield 26, of 18 inches (45.72 cm). In Table 1, the initial FCC selected was below the optimal focal point location or sharp focus value, while in Table 2 the initial value was above the optimal focal point location.

TABLE 1

Focusing sequence - initial current below sharp focus value

| Run No. | Beam diameter - inch | | | focus coil current - mA |
|---|---|---|---|---|
| | horizontal slit | vertical slit | average | |
| 1 | 0.0285 | 0.0391 | 0.0288 | 585.0 |
| 2 | 0.0249 | 0.0255 | 0.0252 | 588.0 |
| 3 | 0.0232 | 0.0243 | 0.0238 | 591.0 |
| 4 | 0.0251 | 0.0257 | 0.0254 | 594.0 |
| 5 | 0.0280 | 0.0277 | 0.0279 | 597.0 |
| sharp focus conditions: | | | 0.0240 | 591.2 |

TABLE 2

Focusing sequence - initial current above sharp focus value

| Run No. | Beam diameter - inch | | | focus coil current - mA |
|---|---|---|---|---|
| | horizontal slit | vertical slit | average | |
| 1 | 0.0332 | 0.0315 | 0.0323 | 600.0 |
| 2 | 0.0276 | 0.0282 | 0.0279 | 597.0 |
| 3 | 0.0243 | 0.0254 | 0.0248 | 594.0 |
| 4 | 0.0233 | 0.0249 | 0.0241 | 591.0 |
| 5 | 0.0254 | 0.0260 | 0.0257 | 588.0 |
| 6 | 0.0280 | 0.0284 | 0.0282 | 585.0 |
| sharp focus conditions: | | | 0.0242 | 591.2 |

As alluded to above, a least-squares algorithm is used to approximately fit the 4–6 data points with the parabolic relation:

$$DB = A_0 + A_1(FCC) + A_2(FCC)^2 \tag{11}$$

Figure 10:
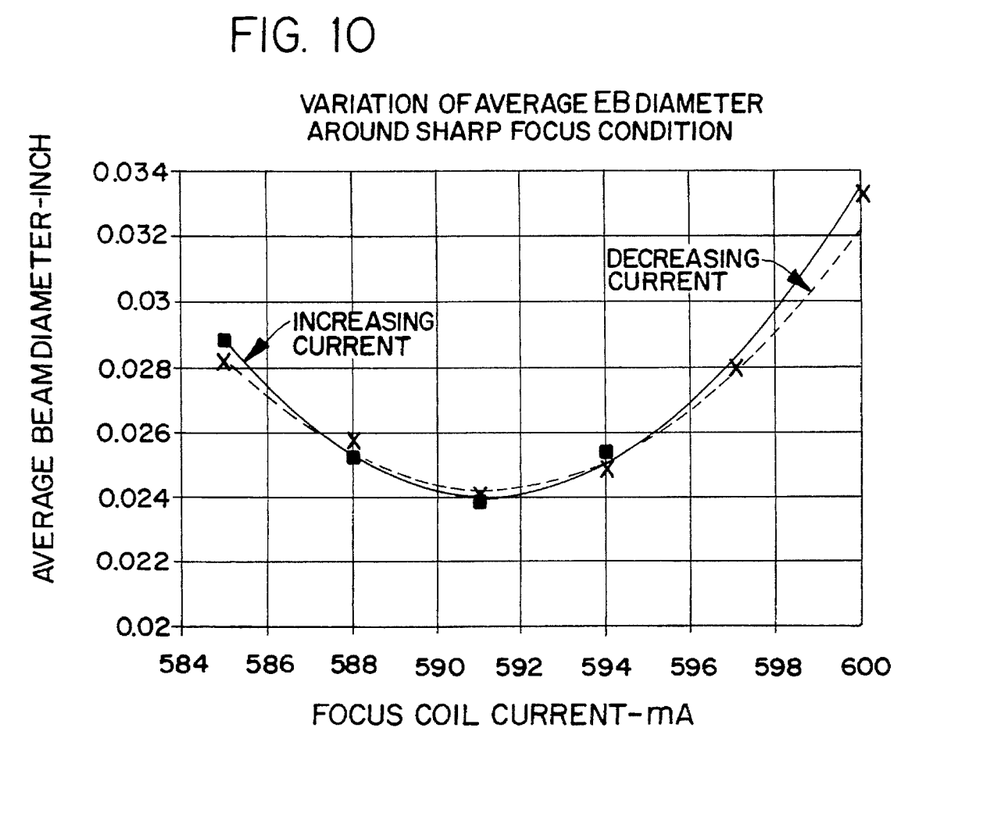
FIG. 10 depicts a plot of average beam diameter as a function of focus coil current.

The parabolic curves thus determined for the data in Tables 1 and 2 are plotted in FIG. 10. As can be seen these curves are good approximations for the variation of the average beam diameter around the sharp focus condition. The current and diameter for sharp focus are then calculated by setting the first derivative of DB with respect to FCC equal to zero.

Repetition of the test at 8 mA and at other beam currents indicated that the close agreement between the increasing and decreasing current results shown in FIG. 10 does not always occur. Sharp focus current values from increasing and decreasing runs were different by as much as 0.5 percent and minimum beam diameters by about 5 percent. Variations on this same magnitude were found in the average beam diameter for single tests at the same sharp focus current value.

These tests indicated that there is some beam variation with time and each time the beam is turned off and on. This is probably due, at least in part, to small variations in the filament condition when the beam is turned on for short time intervals. Fortunately the variation is acceptable.

Examination of the differences between the magnitudes of the diameters determined from the horizontal and vertical slits reveals that the maximum difference in Tables 1 and 2 of about 0.002 inch (0.005 cm) occurred for the current deviating the most from the sharp focus value. All other diameters differed by less than 0.001 (0.0025 cm), or by about 5 percent. This indicates that, as sharp focus is approached, the beam is approximately symmetrical. Hence, the use of a single Gaussian parameter distribution model is appropriate.

Figure 11:
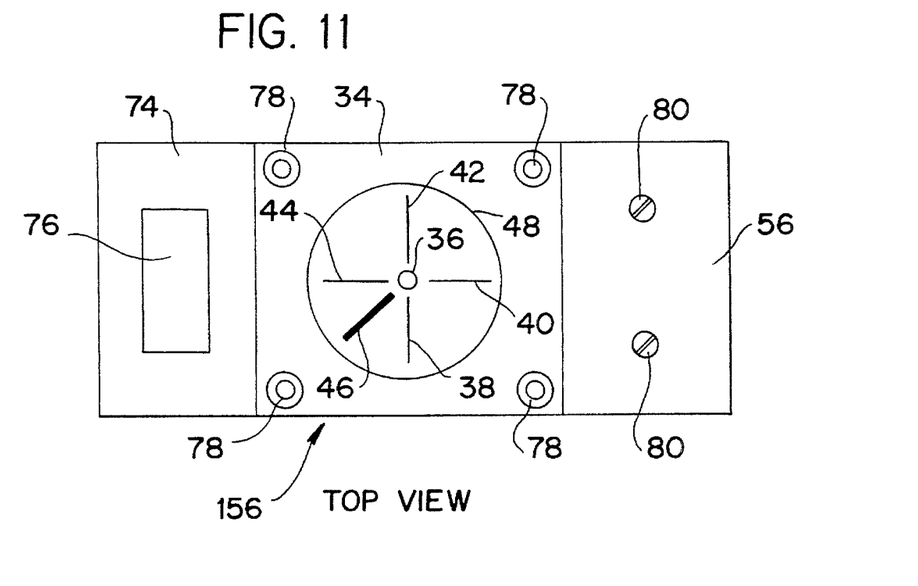
FIGS. 11 and 12 depict a top and side view, respectively, of a second embodiment, a second profilometer (a plural slit-type Faraday electron beam trap).
Figure 12:
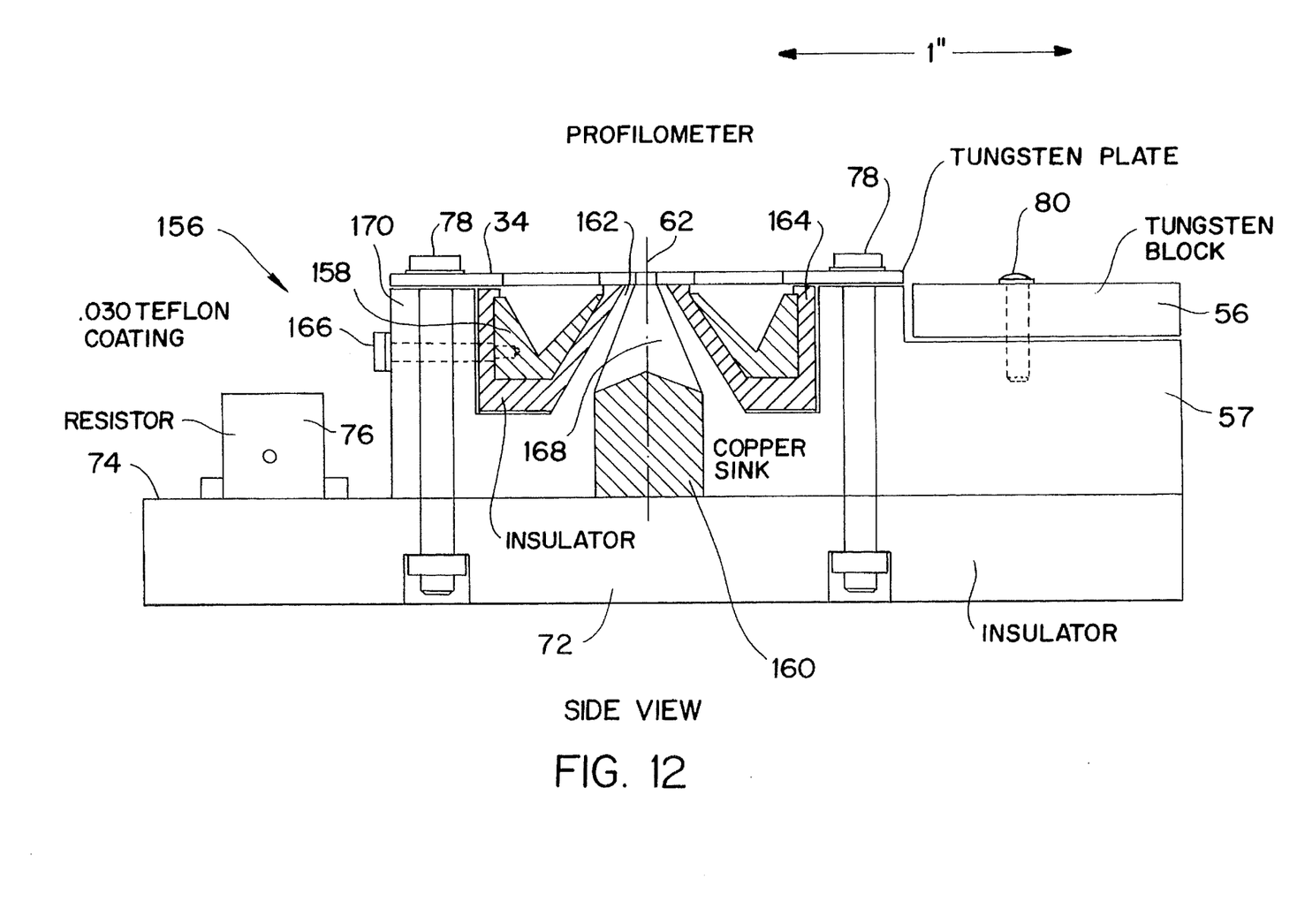

FIGS. 11 and 12 depict a top and side view, respectively, of a second embodiment of Applicants' invention, a second profilometer. Like the first profilometer 32, discussed above, the second profilometer is a plural slit-type Faraday electron beam trap. Applicants' best mode or most preferred embodiment is this second profilometer. For the sake being concise, only those features of the second profilometer that differ from the first profilometer will be discussed.

The second profilometer 156 includes: a current collector annulus 158; energy sink plug 160; energy sink annulus 162; insulator annulus 164; and screw assembly 166. The current collector annulus is now in the form of modified lowercase letter "w" in which the two "v" sections have been separated are no longer connected at a central vertex. Consequently, this surface of revolution sweeps out an annulus symmetric around revolution axis 62. The empty center region of annulus 158 is partially occupied by portions of two separate structures. Closest to the center point is the energy sink annulus 162. Sandwiched in between the energy sink annulus 162 and collector annulus 158 is insulating annulus 164. Electrically isolated screw assembly 166 holds collector annulus 158 against insulator 164, and insulator 164 against outer sink annulus rim 162.

The energy sink is formed in two parts 160 and 162 for machining convenience. The portion of sink annulus 162 closest to center point tapers downward and outward, leaving an inverted solid cone-shaped void 168. The bottom surface of void 168, which is the upper surface of sink plug 160, is also in the shape of an inverted solid cone, except that the latter solid cone has much less steeply sloped sides. Sink annulus 162 and sink plug 160 are in good electrical contact have very low resistivity. An advantage of the shape defining void 168 is that it minimizes reflection of the electron beam when it passes down through central hole 36. Sink annulus 162 is also in good electrical contact with upper plate 34 it two regions: the first is a flat annulus at the rim of center hole 36 and the second is a much larger flat annulus toward that outer edge of upper plate 34. The major advantage of the second profilometer over the first application is that it provides large capacity energy sink, 160 and 162.

Earlier, physical variation in the width of the slits in upper plate 34 was discussed. It was noted that slit width is not required in the calculation of effective beam diameter, DB. It is involved, however, in that local beam current intensities are affected. The finite slit width causes the measured values around the peak of a profile to be lower, and the wing regions to be higher, than an ideal Gaussian distribution. Evaluation of the error in calculated beam diameter showed that for slits around 0.0025 inch (0.00635 cm) wide, the calculated beam diameter will be on the order of 2.5% high. In view of the assumption in the calculation procedure that the beam has a symmetrical Gaussian distribution, and that the beam current variation with time appears to be around ±5%, an error of this small magnitude is acceptable.

The invention has a cost advantage. In addition to the usual production time, the cost of producing welds in a series of parts must also include the cost of a test regime to determine appropriate machine settings for the specified weld. This program will involve main test welds, sectioning these for examination, and in many cases, an additional series of test welds. Once this phase is completed, making the required welds is relatively straight forward, and the potential for reduction in required time will not be substantial. There can be cases, however, where permissible variations in the weld are very limited, and it is necessary to reject a significant fraction of the parts produced.

The greatest potential of a beam current measurement system such as the present invention to reduce costs is in reducing the time required for determination of appropriate machine settings, and in assuring greater consistency in parts produced. This will be achieved by 1) knowing what the beam dimension is, 2) being able to predict and control penetration more accurately, and 3) alerting operators to conditions which could cause porosity and excessive spiking.

Possible savings will depend on the particular application. However, to provide some idea of the potential, consider an example where about two days are required for determination of appropriate machine settings. It may be possible to cut this time in half. Savings achieved in checking machine condition over time would be added to this.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method of profiling an electron beam using a slit-type Faraday trap comprising the steps of:
   (a) moving the beam around a center point;
   (b) determining a first current distribution as the beam passes across a first slit, the first slit being substantially radial to the center point;
   (c) determining a second current distribution as the beam passes across a second slit, the second slit being substantially radial to the center point; and
   (d) calculating a beam diameter as a function of each of the first and second current distributions.

2. A method as in claim 1, wherein:
   the second slit is also substantially perpendicular to the first slit.

3. A method as in claim 1, further comprising the step of:
   (e) determining a third current distribution as the beam passes across a third slit, the third slit being substantially radial to the center point;
   wherein the beam diameter is calculated as a function of each of the first, second, and third current distributions.

4. A method as in claim 3, wherein:
   the third slit is also positioned substantially along a line defined by the first slit but diametrically across the center point from a position of the first slit.

5. A method as in claim 3, further comprising the step of:
   (f) determining a fourth current distribution as the beam passes across a fourth slit, the fourth slit being substantially radial to the center point;
   wherein the beam diameter is calculated as a function of each of the first, second, third, and fourth current distributions.

6. A method as in claim 5, wherein:
   the fourth slit being positioned substantially along a line defined by the second slit but diametrically across the center point from a position of the second slit.

7. A method as in claim 3, wherein:
   the third slit is also positioned so that it substantially bisects a first angle formed between the first and second slit.

8. A method as in claim 7, wherein:
   the first angle is substantially 90°.

9. A method as in claim 1, further comprising:
   (g) determining an index slit, the index slit being substantially defining a fifth line segment and being substantially radial to the center point;
   (h) recognizing the index slit; and
   (i) recognizing a beam angular location as a function of having recognized the index slit.

10. A method as in claim 9, wherein:
    the index is positioned within a second angle defined on a first side by the first slit and on the second side by the second slit.

11. A method according to claim 10, wherein:
    the second angle substantially equals 90°.

12. A method as in claim 10, wherein:
    the index slit is positioned so that it substantially bisects an angle between the first and second sides.

13. A method as in claim 9, further comprising the step of:
identifying a slit determined subsequent to the index slit as the first slit.

14. A method as in claim 13, wherein:
the steps of determining include sampling each distribution, respectively;
the step of moving the beam includes rotating the beam around the center point; and
the step of identifying identifies the first slit as a function of an angular speed of rotation of the beam and a sampling rate.

15. A method as in claim 9, wherein:
a width of the index slit, being defined in a direction substantially perpendicular to a line defined by the index slit, is significantly wider than a width of any of the other slits, respectively.

16. A method as in claim 1, further comprising the steps of:
(j) before moving, warming up the beam for a warm-up period so that beam values settle to substantially steady-state values.

17. A method as in claim 1, wherein:
the beam is assumed to have a Gaussian distribution.

18. A method as in claim 1, wherein the step of calculating a beam diameter includes:
calculating first and second moments of the first distribution and first and second moments of the second distribution.

19. A method as in claim 18, wherein the step of calculating a beam diameter includes:
calculating an average beam diameter as a function of a first beam diameter calculated from the first distribution and a second beam diameter calculated from the second distribution;
the first beam diameter being a function of the first and second moments of the first distribution and the second beam diameter being a function of the first and second moments the second distribution.

20. A method as in claim 18, wherein the step of calculating a beam diameter includes:
calculating an average effective beam diameter, whose radius defines a circle within which 95% of beam current flows, from a first and second effective beam diameter,
each effective beam diameter DB being calculated according to $$DB = 2\sigma_B$$

where $$\sigma_B^2 = 6\sigma^2$$

and $\sigma^2$ is calculated as a function of the first and second moments of the distribution, respectively.

21. A method as in claim 1, wherein:
the beam is moved substantially in a circle.

22. A plural slit-type Faraday electron beam trap apparatus for profiling an electron beam comprising:
an upper plate including at least a first and second slit oriented with respect to a center point, the first slit being substantially radial to the center point, and the second slit being substantially radial to the center point; and
a current collector, mounted underneath but electrically isolated from the upper plate, substantially formed in the shape of a surface of revolution symmetric about a revolution axis, the revolution axis being substantially orthogonal to a plane substantially defined by the upper plate, the revolution axis substantially passing through the center point.

23. An apparatus as in claim 22, wherein:
the second slit is also substantially perpendicular to the first slit.

24. An apparatus as in claim 22, wherein:
the surface of revolution being a planar curve substantially in the shape of a lowercase letter w having a central vertex and two outer vertices, the revolution axis substantially passing through the center vertex.

25. An apparatus as in claim 24, wherein:
the outer vertices are rounded off.

26. An apparatus as in claim 24, wherein:
the outer vertices each have an inner side, the inner sides being connected together at the central vertex.

27. An apparatus as in claim 22, further comprising:
an energy sink, mounted between the upper plate and the collector, the energy sink being in electrical contact with the upper plate but electrically isolated from the collector;
the upper plate including a hole approximately at the location of the center point, the hole being of sufficient size to permit the electron beam to pass through the upper plate without touching the plate when the beam is substantially focused upon the center point.

28. An apparatus as in claim 27, wherein:
the energy sink further includes a high temperature melting point metal bar, positioned in a channel in the energy sink such that the bar is positioned between the energy sink and the upper plate, and such that the bar is in low electrical resistivity contact the energy sink;
a portion of the bar being beneath the hole such that when the electron beam passes the hole without touching the upper plate, the beam contacts the bar.

29. An apparatus as in claim 28, wherein:
the bar and the channel in which it sits being positioned substantially at a 45° angle to each of the slits, respectively.

30. An apparatus as in claim 27, wherein
the energy sink is made of copper.

31. An apparatus as in claim 22, further comprising:
a third slit in the upper plate, the third slit being substantially radial to the center point.

32. An apparatus as in claim 31, wherein:
the third slit is also positioned substantially along a line defined by the first slit but diametrically across the center point from a position of the first slit.

33. An apparatus as in claim 32, wherein:
the third slit is also positioned so that it substantially bisects a first angle formed between the first and second slit.

34. A method as in claim 33, wherein:
the first angle is substantially 90°.

35. An apparatus as in claim 31, further comprising:
a fourth slit in the upper plate, the fourth slit being substantially radial to the center point.

36. An apparatus as in claim 35, wherein:
the fourth slit also being positioned substantially along a line defined by the second slit but diametrically across the center point from a position of the second slit.

37. An apparatus as in claim 22, further comprising:
an index slit in the upper plate, the index slit being substantially radial to the center point.

38. An apparatus as in claim 37, wherein:

the index slit being positioned within a second angle defined on a first side by the first slit and on the second side by the second slit.

39. An apparatus as in claim 38, wherein:

the second angle substantially equals 90°.

40. An apparatus as in claim 38, wherein:

the index slit is also positioned so that it substantially bisects the second angle.

41. An apparatus as in claim 22, wherein:

the surface of revolution being a planar curve substantially in a shape of a modified lowercase letter w in which two sections in a of a lowercase letter "v" are separated by a separation distance, the revolution axis substantially passing through a midpoint the separation distance, the surface of revolution thereby sweeping out an annular surface.

42. An apparatus as in claim 41, wherein:

the upper plate including a hole approximately at the location of the center point of sufficient size to permit the electron beam to pass through the upper plate without touching the plate when the beam is substantially focused upon the center point, and a central opening of the annular surface being of sufficient size to permit the electron beam to pass through the surface such that when the beam is focused upon the center point, the beam passes through the annular surface opening without touching the surface and contacts the energy sink.

43. An apparatus as in claim 42, further comprising:

an energy sink, mounted beneath but electrically isolated from the current collector, a portion of the energy sink defining an annulus having a central opening of narrower radius than a radius of the central opening of the current collector such that the energy sink annular portion fits inside the annular current collector.

44. An apparatus as in claim 43, wherein:

the energy sink annular opening tapers outward and downward from the hole in the upper plate, creating a void in the energy sink in the shape of a first solid cone.

45. An apparatus as in claim 44, wherein:

a floor of the void is formed in the shape of a second solid cone having the same orientation as the first solid cone, the sides of the first solid cone being closer to parallel with the revolution axis than sides of the second solid cone.

46. An apparatus as in claim 43, wherein the energy sink is made of copper.

47. A method of setting focus coil current in an electron beam welder, comprising the steps of:

(a) determining a first and second electron beam current distribution;

(b) calculating a beam diameter as a function of each of the first and second current distributions; and (c) setting a desired focus coil current as a function of the beam diameter; wherein step (b) further includes calculating an average beam diameter as a function of a first beam diameter calculated from the first distribution and a second beam diameter calculated from the second distribution;

the first beam diameter is a function of the first and second moments of the first distribution and the second beam diameter is a function of the first and second moments of the second distribution; and the desired focus coil current is determined as a function of the average beam diameter.

48. A method as in claim 47, wherein:

step (b) further includes calculating an average effective beam diameter, whose radius defines a circle within which 95% of beam current flows, from a first and second effective beam diameter, each effective beam diameter DB being calculated according to $$DB = 2\sigma_B$$

where $$\sigma_B^2 = 6\sigma^2$$

and $\sigma^2$ is calculated as a function of the first and second moments of the distribution, respectively, and desired focus coil current being determined as a function of a the average effective beam diameter.

49. A method of setting focus coil current in an electron beam welder, comprising the steps of:

(a) determining a first and second electron beam current distribution;

(b) calculating a beam diameter as a function of each of the first and second current distributions; and (c) setting a desired focus coil current as a function of the beam diameter; wherein steps (a), (b), and (c) are iteratively performed until a sufficient number of beam diameters are calculated such that coefficients of a parabolic equation can be determined; and the desired focus coil current is determined as a function of a minimum value of the parabolic equation.

50. A method as in claim 49, wherein:

the coefficients of the parabolic equation are fitted using the method of least-squares.

51. A system for setting focus coil current in an electron beam welder, comprising:

a beam sampler that determines a first and second electron beam current distribution;

a beam profiler, responsive to the beam sampler, for calculating a beam diameter as a function of each of the first and second current distributions; and a beam controller, responsive to the beam profiler, for setting a desired focus coil current as a function of the beam diameter; wherein the beam profiler further includes means for calculating an average beam diameter as a function of a first beam diameter calculated from the first distribution and a second beam diameter calculated from the second distribution;

the first beam diameter is a function of the first and second moments of the first distribution and the second beam diameter is a function of the first and second moments of the second distribution, and desired focus coil current is determined as a function of the average beam diameter.

52. A system as in claim 51, wherein:

the beam profiler further includes means for calculating an average effective beam diameter, whose radius defines a circle within which 95% of beam current flows, from a first and second effective beam diameter, each effective beam diameter DB being calculated according to $$DB = 2\sigma_B$$

where $$\sigma_B^2 = 6\,\sigma^2$$

and $\sigma^2$ is calculated as a function of the first and second moments of the distribution, respectively, and the beam controller calculating desired focus coil as a function of a the average effective beam diameter.

53. A system for setting focus coil current in an electron beam welder, comprising:

a beam sampler that determines a first and second electron beam current distribution;

a beam profiler, responsive to the beam sampler, for calculating a beam diameter as a function of each of the first and second current distributions; and a beam controller, responsive to the beam profiler, for setting a desired focus coil current as a function of the beam diameter; wherein the beam profiler iteratively calculates beam diameters until a sufficient number of beam diameters are calculated such that the beam controller can calculate coefficients of a parabolic equation; and the beam controller calculates desired focus coil current as a function of a minimum value of the parabolic equation.

54. A system as in claim 53 wherein:

the beam controller fits the coefficients of the parabolic equation using least-squares.

* * * * *